(12) United States Patent
Wang et al.

(10) Patent No.: US 8,386,614 B2
(45) Date of Patent: Feb. 26, 2013

(54) NETWORK CONNECTION MANAGER

(75) Inventors: Lifeng Wang, Beijing (CN); Jian Wang, Beijing (CN); Yang Li, Beijing (CN); Yunxin Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 11/807,130

(22) Filed: May 25, 2007

(65) Prior Publication Data

US 2008/0294778 A1 Nov. 27, 2008

(51) Int. Cl.
*G06F 15/16* (2006.01)
(52) U.S. Cl. ...................................... 709/227
(58) Field of Classification Search .................. 709/227, 709/225, 223; 370/389, 392
See application file for complete search history.

(56) References Cited

U.S. PATENT DOCUMENTS

| | | | | |
|---|---|---|---|---|
| 5,923,854 | A * | 7/1999 | Bell et al. | 709/243 |
| 6,101,181 | A * | 8/2000 | Passint et al. | 370/352 |
| 6,349,355 | B1 | 2/2002 | Draves et al. | |
| 6,393,484 | B1 * | 5/2002 | Massarani | 709/227 |
| 6,901,455 | B2 | 5/2005 | Gough | |
| 7,065,575 | B1 | 6/2006 | Machiraju et al. | |
| 7,200,704 | B2 * | 4/2007 | Njoku et al. | 710/316 |
| 7,467,191 | B1 * | 12/2008 | Wang et al. | 709/221 |
| 7,477,640 | B2 * | 1/2009 | Oguchi et al. | 370/389 |
| 2002/0184358 | A1 * | 12/2002 | Traversat et al. | 709/223 |
| 2003/0222801 | A1 | 12/2003 | Ying et al. | |
| 2004/0024787 | A1 | 2/2004 | Edwards et al. | |
| 2004/0047344 | A1 | 3/2004 | Chan et al. | |
| 2004/0193761 | A1 | 9/2004 | Ouchi | |
| 2005/0021847 | A1 | 1/2005 | Rothman et al. | |
| 2005/0232190 | A1 | 10/2005 | Karaoguz et al. | |
| 2006/0090003 | A1 * | 4/2006 | Kakivaya et al. | 709/238 |
| 2008/0261582 | A1 * | 10/2008 | Sarkar et al. | 455/422.1 |

OTHER PUBLICATIONS

"Connecting Linux and Windows CE via Serial & IrDA", http://www.pocketpcfaq.com/wce/linux-serial.htm.
"Share one monitor, keyboard, and mouse between two computers", http://www.mobilitysite.com/2006/03/share_one_monitor_keyboard_and_mouse_bet.php.
Calhoon, John, "Mobile Computing with Windows XP", Date: Jul. 2001, http://www.microsoft.com/technet/prodtechnol/winxppro/evaluate/mblxp.mspx.
Silberschatz et al., *Operating System Concepts*. 2004. 7th Ed. Wiley & Sons, Inc., pp. 133-159, 167-186; Index and abstract only (10 pages).
Woodside et al., "The Stochastic Rendezvous Network Model for Performance of Synchronous Client-Server-like Distributed Software," Jan. 1995, *IEEE Transactions on Computers*, 44(1):20-34.
International Search Report dated Aug. 29, 2008 in International Application No. PCT/US2008/064812.
"Connecting Linux and Windows CE via Serial & IrDA", downloaded Apr. 20, 2007 from http://www.pocketpcfaq.com/wce/linux-serial.htm, 6 pages.
"Share one monitor, keyboard, and mouse between two computers", downloaded Apr. 20, 2007 from http://www.mobilitysite.com/2006/03/share_one_monitor_keyboard_and_mouse_bet.php, 3 pages.

* cited by examiner

*Primary Examiner* — Brian P Whipple
(74) *Attorney, Agent, or Firm* — Hope Baldauff Hartman, LLC (57) ABSTRACT

Described herein is technology for, among other things, facilitating network communications. It involves various techniques for facilitating network communications by creating virtual named channels which allow applications and thereby users to communicate over a wide variety of networks interfaces without requiring specific knowledge or programming corresponding to the underlying network. Thus, the technology may provide a uniform interface to handle network connections on different types of computing devices and over different types of networks.

18 Claims, 8 Drawing Sheets

NETWORK CONNECTION MANAGER

BACKGROUND

Computer networks connect various types of computer systems, connected to various other devices, in a manner that enables the network connected computer systems to communicate with each other. Each computer may have a plurality of network interfaces which connect the computer to different networks. Each network, in turn, may have specific protocols and procedures for communicating over the network.

In order to initiate communication over a computer network, information corresponding to the specific protocols, procedures, and network interface of the network must be provided. For example, for communication over a transmission control protocol/internet protocol (TCP/IP) based network, specific information such as an IP address and TCP port must be provided in order for communication over the network to successfully occur. When applications are developed and subsequently used by users, specific knowledge of the network connections and network protocols is necessary for communication over a computer. Thus, application developers and/or users may be required to have expert knowledge of protocols and information specific to the computer network and network interface. Furthermore, in order to support a wide variety of network communication interfaces, an application must have appropriate libraries and corresponding programs in order communicate over each individual interface. Therefore, the requirement of network specific information, procedures, and network interface information in order to communicate over a computer network creates a burden for application developers and users. Unless the developers and users supply the proper, requisite network information corresponding to their particular network, they may be prohibited from being able to develop and use network-based applications. Obtaining such network information may be problematic because software developers and users often are not intimately familiar with networking protocols and procedures.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, facilitating network communications. It involves various techniques for facilitating network communications by creating virtual named channels which allow applications and thereby users to communicate over a wide variety of networks interfaces without requiring specific knowledge or programming corresponding to the underlying network. Thus, the technology may provide a uniform interface to handle network connections on different types of computing devices and over different types of networks.

In one implementation, a set of application programming interface calls may be used to establish a virtual named channel and thereby facilitate communications over a variety of networks. Various functions are performed by a network connection manager such as creating virtual named channels on each interface and translating the virtual named channel and the host addresses. The name of the virtual named channel is used by an application or user to communicate over the computer network. Thus, application developers and users are not required to provide network or network interface specific information in order to communicate over the network.

Techniques described herein provide communications over various networks without requiring users or application developers to have knowledge of specific network information. Thus, users and developers are able to more easily use and develop applications which utilize network communication.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail so as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

OVERVIEW

Described herein is technology for, among other things, facilitating network communications. It involves various techniques for facilitating network communications by creating virtual named channels which allow applications and thereby users to communicate over a wide variety of networks interfaces without requiring specific knowledge or programming corresponding to the underlying network. Thus, the technology may provide a uniform interface to handle network connections on different types of computing devices and over different types of networks.

In one implementation, a set of application programming interface calls may be used to establish a virtual named channel and thereby facilitate communications over a variety of networks. Various functions are performed by a network connection manager such as creating virtual named channels on each interface and translating the virtual named channel and the host addresses. The name of the virtual named channel is used by an application or user to communicate over the computer network. Thus, application developers and users are not required to provide network or network interface specific information in order to communicate over the network.

Techniques described herein provide communications over various networks without requiring users or application developers to have knowledge of specific network information. Thus, users and developers are able to more easily use and develop applications which utilize network communication.

EXAMPLE OPERATING ENVIRONMENTS

Figure 1:
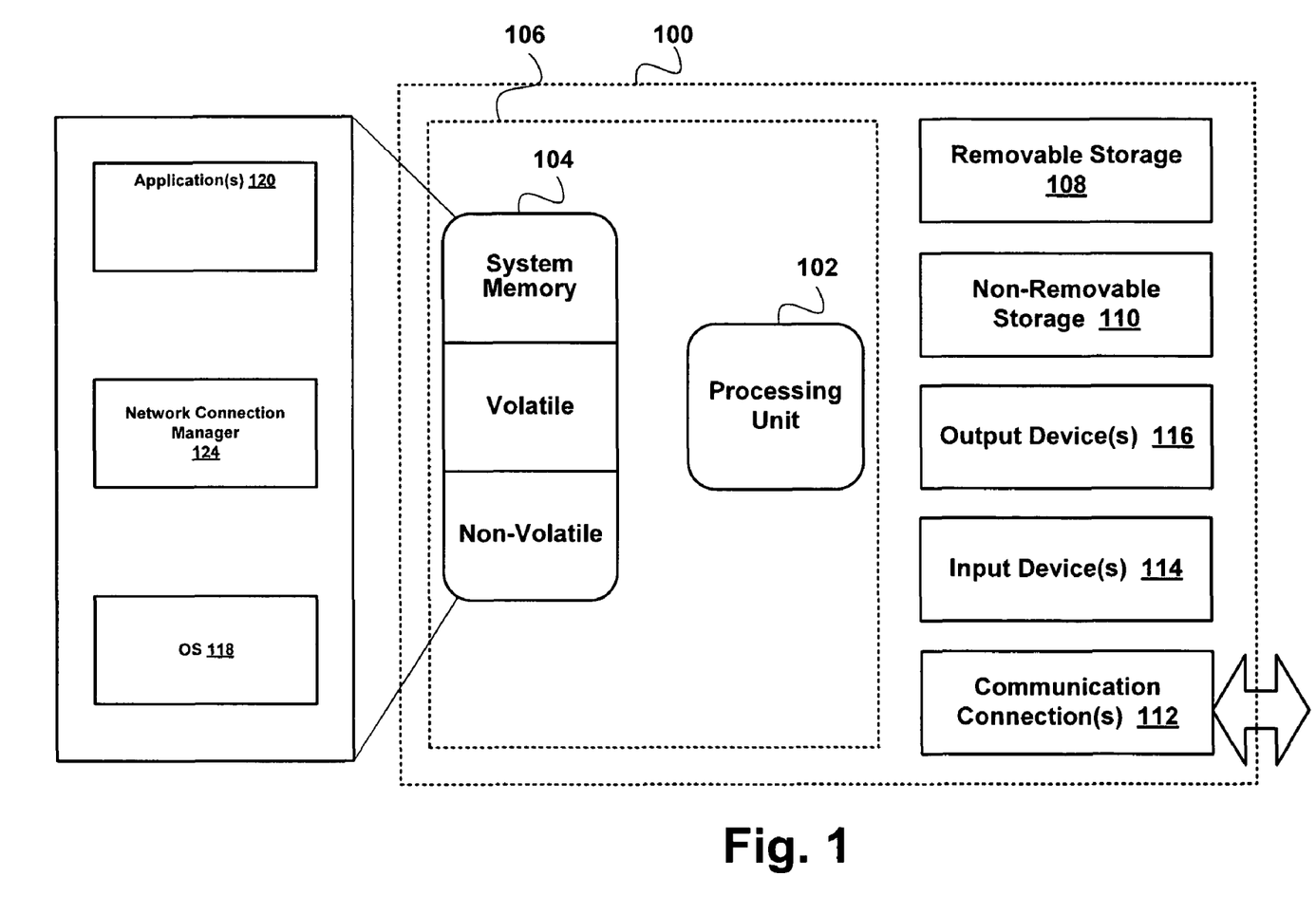
FIG. 1 is a block diagram of an exemplary computing system environment for implementing an embodiment.

With reference to FIG. 1, an exemplary system for implementing embodiments includes a general purpose computing system environment, such as computing system environment 100. Computing system environment 100 may include, but is not limited to, desktop computers, laptops, tablet PCs, mobile devices, and smartphones. In its most basic configuration, computing system environment 100 typically includes at least one processing unit 102 and memory 104. Depending on the exact configuration and type of computing system environment, memory 104 may be volatile (such as RAM), non-volatile (such as ROM, flash memory, etc.) or some combination of the two. This most basic configuration is illustrated in FIG. 1 by dashed line 106.

System memory 104 may include, among other things, Operating System 118 (OS), application(s) 120, and network connection manager 124. Application(s) 120 may include a variety of applications some of which may access data and resources on a computer network. Network communication manager 124 facilitates communication of application(s) 120 and thereby users through communications connection(s) 112 without requiring applications or users to provide specific network details. It is appreciated that embodiments of network connection manager 124 may be integrated or otherwise be included in operating system 118.

Additionally, computing system environment 100 may also have additional features/functionality. For example, computing system environment 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and nonremovable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 100. Any such computer storage media may be part of computing system environment 100.

Computing system environment 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 112 may allow computing system environment 100 to communication over various networks types including, but not limited to, Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 112 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 100 may also have input device(s) 114 such as a keyboard, mouse, pen, voice input device, touch input device, remote control, etc. Output device(s) 116 such as a display, speakers, etc. may also be included. All these devices are well known in the art and need not be discussed at length here.

Figure 2:
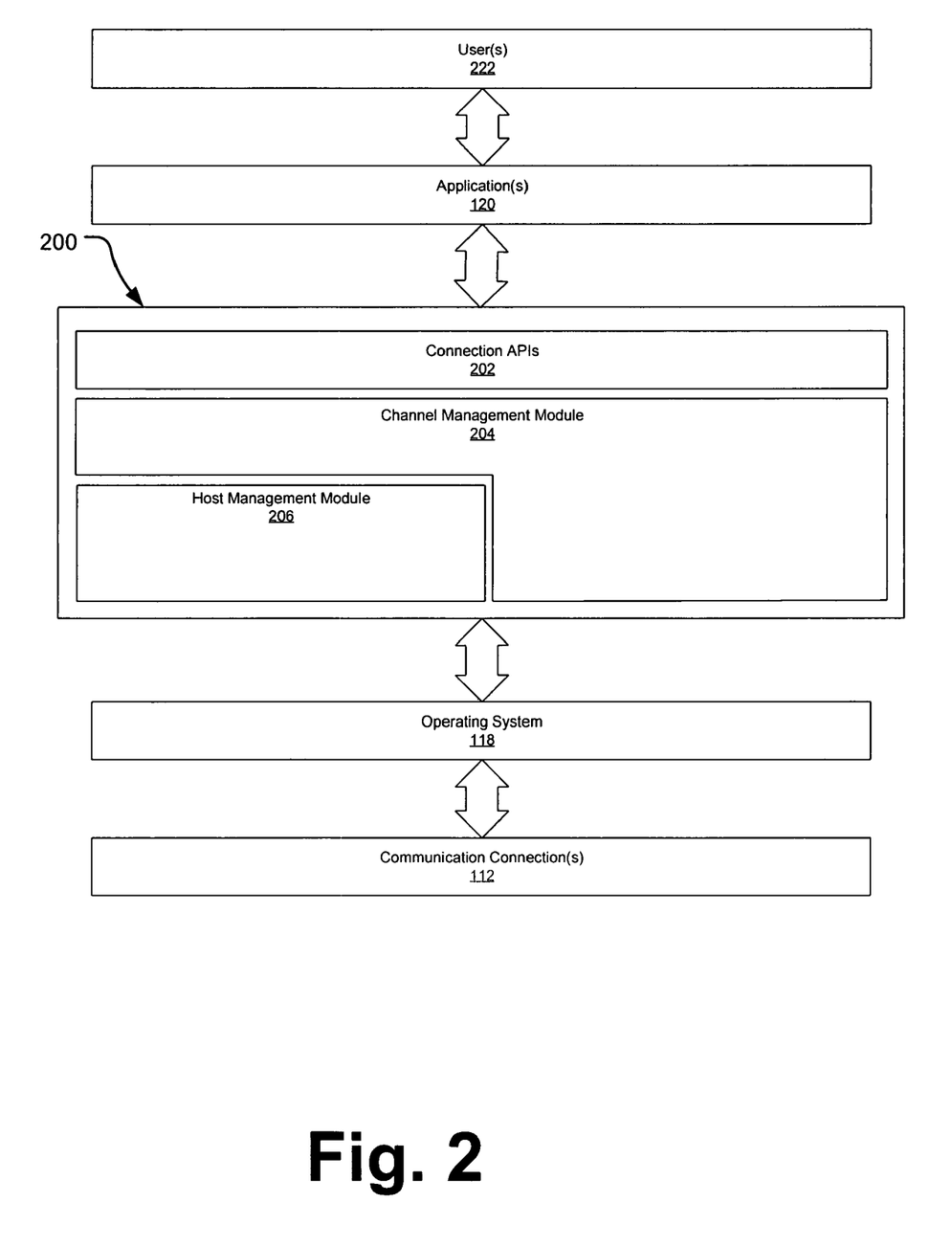
FIG. 2 is a block diagram of an exemplary system for facilitating network communication in accordance with an embodiment.

FIG. 2 shows another view of an exemplary environment for implementing embodiments. In one embodiment, system 200 may be part of a framework to share resources or a network of associated computers for sharing resources. System 200 is a network communication manager, such as network communication manager 124, for facilitating network communications for application(s) 120 and user(s) 222 without requiring application(s) 120 and user(s) 222 to provide network specific information. For examples, user(s) 222 and application(s) 120 may make requests for the network communication to system 200 and system 200 will manage and carryout network communications via interaction with operating system 118. Operating system 118 may thereby perform the network communications via communication connection(s) 112. In one embodiment, system 200 includes connection APIs module 202, channel management module 204, and host management module 206. As described in further detail below, application(s) 120 and user(s) 222 may make calls to APIs in connection APIs module 202 of system 200 to perform network communications. Channel management module 204 facilitates the creation and management of virtual named channels for facilitating network communication as described further herein. Host management module 206 handles host discovery and address resolving as described further herein. Thus, embodiments of system 200 may facilitate network communication for application(s) 120 and user(s) 222 without requiring or needing application(s) 120 and user(s) 222 to provide network specific information such as IP addresses and TCP ports.

The claimed subject matter is described in terms of these example environments. Description in these terms is provided for convenience only. It is not intended that the invention be limited to application in this example environment. In fact, after reading the following description, it will become apparent to a person skilled in the relevant art how to implement the claimed subject matter in alternative embodiments.

EXAMPLE SYSTEMT

Figure 3:
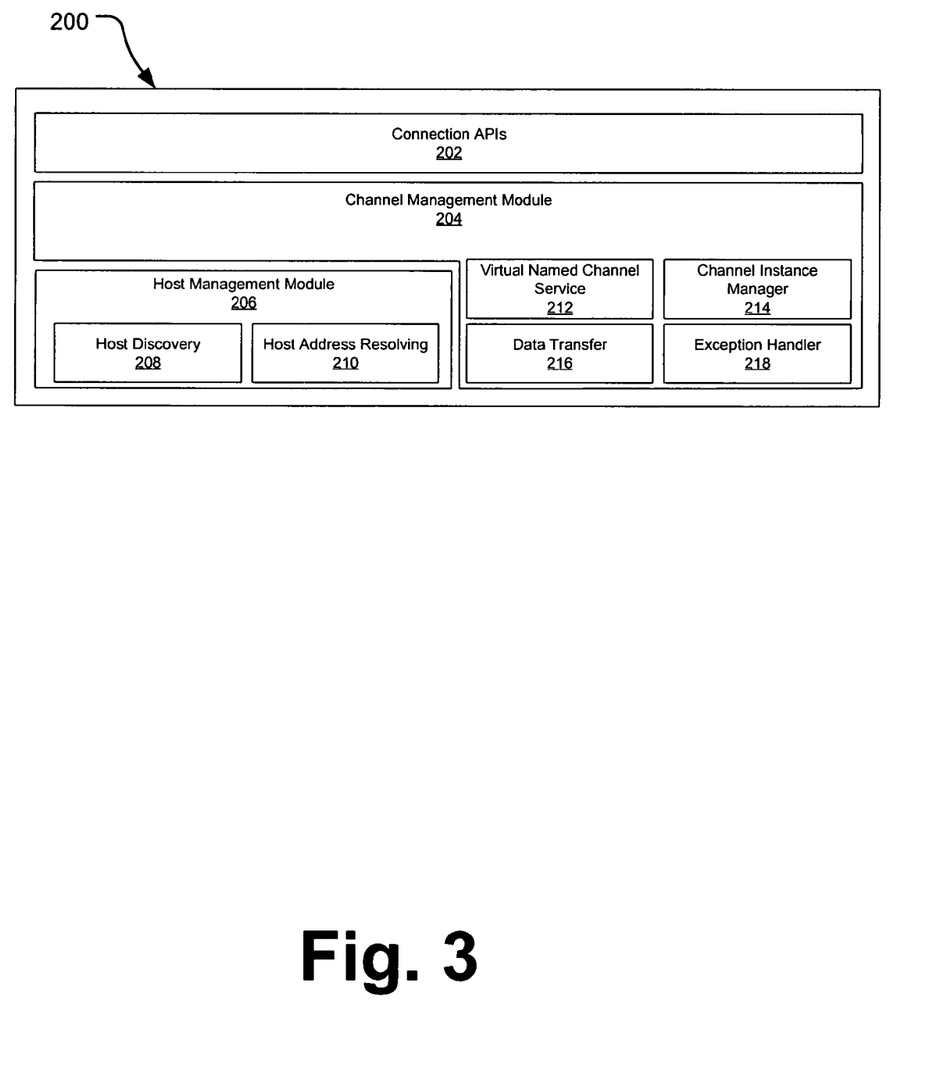
FIG. 3 is a block diagram of an exemplary operating environment of a system for facilitating network communication, in accordance with an embodiment.

The following discussion sets forth details of the present technology systems for network communication management. FIG. 3 illustrates example components used by various embodiments of the present technology. System 200 includes components or modules that, in various embodiments, are carried out by a processor under the control of computer-readable and computer-executable instructions. The computer-readable and computer-executable instructions reside, for example, in data storage features such as computer usable memory 104, removable storage 108, and/or non-removable storage 110 of FIG. 1. The computer-readable and computer-executable instructions are used to control or operate in conjunction with, for example, processing unit 102 of FIG. 1. It should be appreciated that the aforementioned components of system 200 can be implemented in hardware or software or in a combination of both. Although specific components are disclosed in system 200 such components are examples. That is, embodiments are well suited to having various other components or variations of the components recited in system 200. It is appreciated that the components in system 200 may operate with other components than those presented, and that not all of the components of system 200 may be required to achieve the goals of system 200.

FIG. 3 shows a block diagram of an exemplary system 200 for network connection management, in accordance with an embodiment. System 200 includes connection application programming interfaces (APIs) module 202, channel management module 204, and host management module 206.

Referring to FIG. 3, connection APIs 202 provide a common and unified set of functions which may be called by application(s) 120 or user(s) 222 to communicate over a network. In one embodiment, the function call may be linked into a single dynamic link library (DLL) with an additional exported library. Connection APIs 202 can enumerate the available virtual named channels and associated names of the virtual named channels. Connection APIs 202 includes a set of functions which allow application(s) 120 and user(s) 222 to communicate by using the name of the virtual named channel rather than resolving network specific information such as IP address and port number. Connection APIs 202 may be used to facilitate communication on each network interface on a computer. In one embodiment, the application that creates a virtual named channel and is listening for clients may be known as a server. The computer or host which connects to the virtual named channel or server may be known as a client. Thus, system 200 allows applications on different computers to communicate without knowing how the computers are connected.

Channel management module 204 provides the underlying implementation of the APIs of connection APIs 202. Each virtual named channel created by channel management module 204 may have a unique name and allow bidirectional communication. Channel management module 204 may create a virtual named channel for each connection between two computers. In one embodiment, the virtual named channel may be formatted as "//Servername/channelname" whereby Servername is either the name of a remote computer or a period, which specifies a local computer. Thus, when a virtual named channel is created, the Servername portion will be a period. In another embodiment, the channel name length may be limited to a specific number of characters (e.g., 256 characters). The channel names may also be case insensitive. Channel management module 204 may include virtual named channel service 212, channel instance management module 214, data transferring module 216, and exception handling module 218.

Virtual named channel service 212 manages each virtual named channel which can be connected to by one or more clients. The computer providing the virtual named channels can be viewed as a server to the extent that resources and/or services are provided to clients. Virtual named channel service 212 ensures each virtual named channel on a server is associated with an actual communication socket and the server will begin to listen on the socket before any clients can connect with the virtual named channel. In one embodiment, a TCP socket bound on a specific port is created for each virtual named channel.

Channel instance management module 214 manages the mapping relationship between virtual named channel instances and the underlying communication sockets. In one embodiment, channel management module 204 sends requests to each host requesting information about all the virtual named channels on the host such as channel name, channel properties, and channel end point address (e.g., IP and port). Channel management module 214 may save the information to a local cache and then return the virtual named channel information to the application or user. In another embodiment, the content of the cache may be returned directly without querying other hosts when the application enumerates available virtual named channels for better performance. Data transferring module 216 controls how data is sent and received over the virtual named channel. Exception handling module 218 handles exceptions and errors on virtual named channels. In one embodiment, exception handling module 218 ensures exceptions and errors occurring on the underlying communication sockets are reflected on the corresponding virtual channel instance and applications are notified about these exception and error events.

Communication between a virtual named channel server and client is based on the particular virtual named channel instance. In one embodiment, the virtual named channel instance may be implemented as a wrapper of low-level TCP socket objects which may be managed by the operating system. For example, when a client connects to a server channel, an underlying TCP socket is created and connects with the TCP server socket of the server channel and subsequently the underlying TCP socket is wrapped by a virtual named channel instance which is used by the client to communicate with the server. At the server side, a TCP socket is created each time a client connects to the server, the TCP socket is then wrapped by a virtual named channel instance with is used by the server application to communicate with the client. The underlying sockets on each side are responsible for actually transferring the data through the virtual named channel. The relationship between the virtual named channel instance and the underlying socket is managed by channel instance manager 214. Exceptions and errors occurring on the underlying socket are reflected on the corresponding virtual channel instance and applications are notified about the exception and error events.

Each virtual named channel instance can be operated in blocking mode or non-blocking mode. In blocking mode, receiving and sending operations on a virtual named channel will be blocked until there is data to be read from the channel or the data sent to the channel has finished being transmitted. In non-blocking mode, reading and sending operations on a channel may immediately be performed and the actual operations on the virtual named channel instance are asynchronous.

Each virtual named channel can further be operated in a message based or byte-stream based format. In message based format, the basic unit of data used on the channel instance is a well defined message. In one embodiment, a message based channel instance will be operated in blocking mode. For example, a reading operation will be blocked until the whole message, including a message header and data portion, has been received. As another example, a subsequent sending operation will be blocked until all parts of the message have been sent out through the virtual named channel. In another embodiment, a channel instance is byte-stream based and the basic unit of data on the channel instance is a byte. Byte-stream based channel instances may be operated in blocking or non-blocking mode.

Host management module 206 includes host discovery module 208 and host address resolving module 210. Each network connection manager instance may have assigned group and password information, such that each virtual named channel for a particular network connection manager instance may have the same group information. The group information may be used by host management module 206 to guarantee that only hosts with the same group name and password can discover each other. In one embodiment, the group name and password may be specified by application(s) 120 and/or user(s) 222 when a network connection manager instance is initialized. Host management module 206 facilitates discovery of nearby computers or hosts which are also running a network connection manager supporting virtual named channels and stores a list of the computers detected. In one embodiment, when the network connection manager is initialized on a host in a LAN or a WAN supporting IP multicast, the host may join a special multicast group and host management module 206 may send an IP multicast packet containing the host's network address to the special multicast group to indicate that it is joining the associated network of computers or framework to share resources. In response, other hosts that have already joined the special multicast group may reply directly to the host with UDP packets to indicate their existence and associated host information. This process allows the newly joined host and the existing hosts to discover each other. On each computer or host that has joined the multicast group, host management module 206 will send a multicast packet to the special multicast group every few minutes to indicate its existence. When a host is leaving, host management module 206 will send a multicast packet to notify others hosts that the host is leaving. If the network (e.g., LAN and WAN) does not support IP multicast, IP broadcast may be used for host discovery. When the network does not support IP multicast or IP broadcast, i.e. Ad-hoc Bluetooth network, the discovery process is performed by host management module 206 by using operating system calls and related interfaces provided by an operating system (e.g., Bluetooth protocol stack). When a host is discovered, heartbeat messages may be sent periodically to detect if a host is still operating. In response to a heartbeat message, a host may respond with a list of virtual named channels and detected host list.

In another embodiment, the host management module 206 on each computer will transmit the list of nearby computers to each other to allow each computer to discover the other computers without which would not otherwise be possible. For example, where a first computer can discover a second computer but cannot discover a third computer (which is discoverable by the second computer), the second computer can share the list of nearby computers with the first computer and thereby allow the first computer to discover and communicate with the third computer. The exchange of computer list information may be done in response to a heartbeat signal or packet which is sent to detect if a computer is still operating.

Host discovery module 208 hides the details of discovering available hosts in the network environment. For example, if the network connection is a LAN or WAN, internet protocol (IP) multicast messages may be used to discover other computers. In contrast, if the network is an Ad-hoc Bluetooth network, direct searching may be performed to discover other hosts.

Host address resolving module 210 resolves the network address of a host. For example, host address resolving module 210 may resolve a virtual named channel servername to a specific IP address and TCP port which is used to carry out network communications.

EXAMPLE OPERATIONS

The following discussion sets forth in detail the operations of the present technology for network communication management. With reference to FIGS. 4-7, flowcharts 400, 500, 600, and 700 each illustrate example blocks used by various embodiments of the present technology. Flowcharts 400, 500, 600, and 700 include processes that, in various embodiments, are carried out by a processor under the control of computer-readable and computer-executable instructions. The computer-readable and computer-executable instructions reside, for example, in data storage features such as computer usable memory 104, removable storage 108, and/or non-removable storage 110 of FIG. 1. The computer-readable and computer-executable instructions are used to control or operate in conjunction with, for example, processing unit 102 of FIG. 1. Although specific blocks are disclosed in flowcharts 400, 500, 600, and 700, such blocks are examples. That is, embodiments are well suited to performing various other blocks or variations of the blocks recited in flowcharts 400, 500, 600, and 700. It is appreciated that the blocks in flowcharts 400, 500, 600, and 700 may be performed in an order different than presented, and that not all of the blocks in flowcharts 400, 500, 600, and 700 may be performed.

Figure 4:
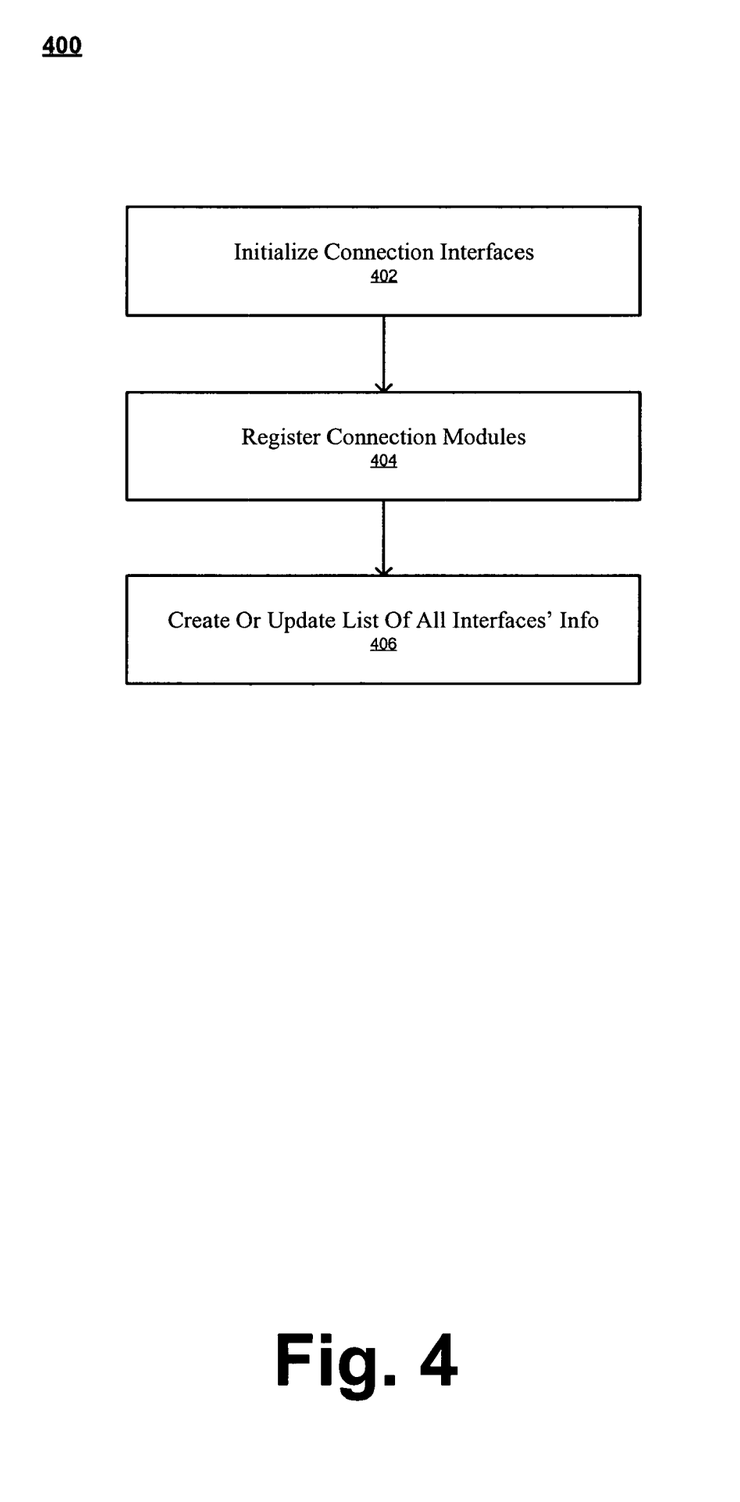
FIG. 4 is a flowchart of an exemplary process for initializing a plurality of connection interfaces, in accordance with an embodiment.

FIG. 4 is a flowchart 400 of an exemplary process for initializing a plurality of connection interfaces, in accordance with an embodiment. The connection interfaces may be initialized when a network connection manager system is started.

At block 402, each connection interface is initialized. In one embodiment, a module specific to each connection interface is loaded. For example, TCP/IP and Bluetooth modules may be loaded for the Bluetooth connection interface.

At block 404, the connection modules are registered. As each connection is initialized the corresponding connection interface module is registered which allows a network connection manager access to the functions in each module. In one embodiment, as each connection module is registered a handle for the corresponding connection is created. Referring to the above example, when the TCP/IP and Bluetooth modules are registered the network connection manager can access the functions associated with the TCP/IP and Bluetooth modules to facilitate network communication.

At block 406, a list of all the connection interfaces' information is created or updated. In one embodiment, each list entry may contain a handle for the connection, the interface name, and a list of interface information. The list of connection interface information may be used by various portions of the network connection manager to perform tasks related to carrying out network communications, such as making connections and determining which connection to use.

Figure 5:
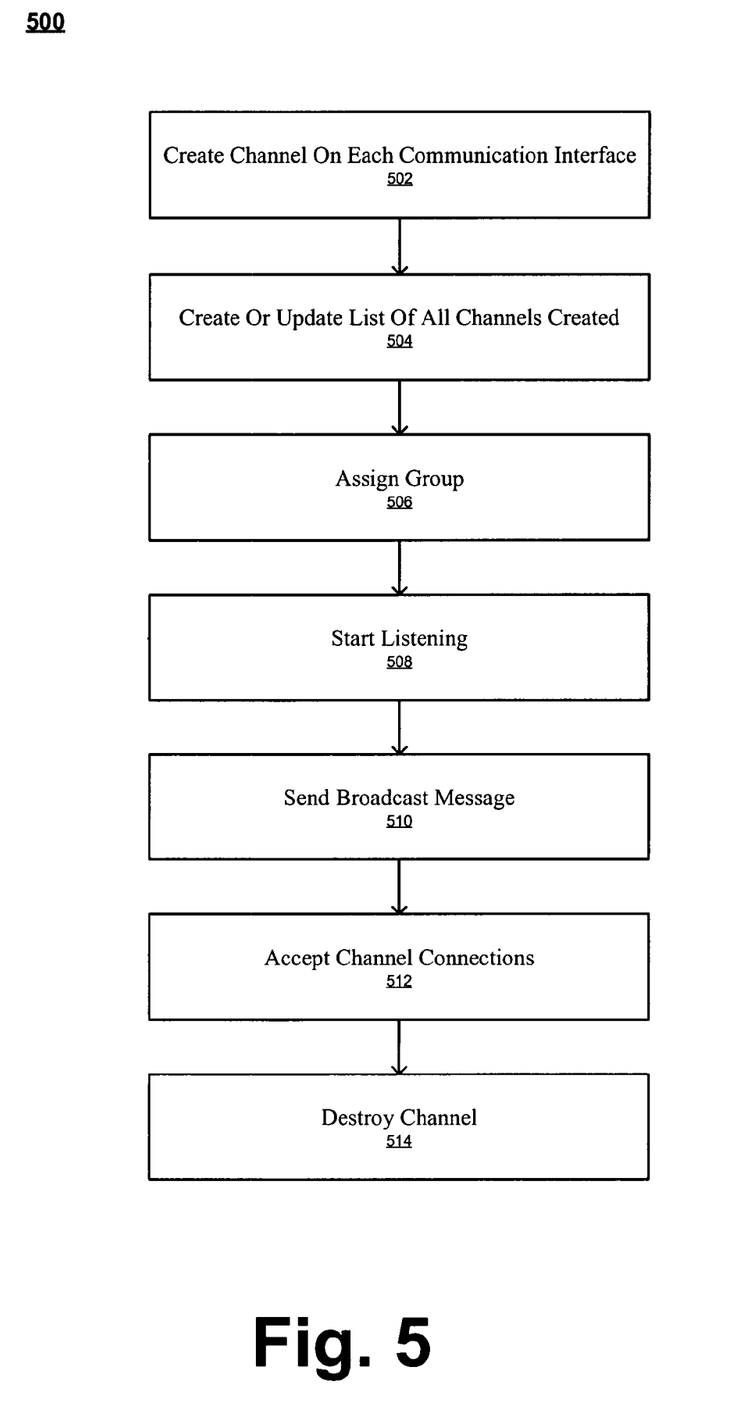
FIG. 5 is a flowchart of an exemplary process for establishing and terminating communication over a virtual named channel, in accordance with an embodiment.

FIG. 5 is a flowchart 500 of an exemplary process for establishing and terminating communication over a virtual named channel, in accordance with an embodiment. The blocks of flowchart 500 may be carried out by a computer acting as a server. It is appreciated the computer carrying out the blocks of flowchart 500 may not necessarily be a specialized server computing system but rather a computer which is providing resources or services and thus may be acting as a server in a peer to peer network. In one embodiment, the blocks of flowchart 500 may initiated or otherwise performed by application(s) 120 and/or user(s) 222 via API function calls.

At block 502, a virtual named channel is created on each communication interface. Each connection interface may be initialized as described above. The virtual named channels may be assigned a name, such as the machine or host name, upon creation. In one embodiment, a network connection manager calls a create virtual named channel function when it starts. This function may create a virtual named channel on each communication interface, so a single virtual named channel can communicate with other computers on every connection interface.

At block 504, a list of all virtual named channels is created or updated. For example, the list may contain the virtual named channels that were created in the prior blocks. In one embodiment, each list entry may contain a list head entry, the name of the virtual named channel, channel information, and a pointer to a callback function for accepting a connection.

At block 506, a group is assigned to the virtual named channels. The group information may be assigned based on a network connection manager instance; such that all virtual named channels created by a single network connection manager instance have the same group information. The group name and password may be specified by application(s) or user(s) when the network connection manager is initialized. The group and password assignment for a virtual named channel can be used to allow connections in only a specific group of associated computers or framework of computers sharing resources. The group and password assigned to the virtual named channel may be stored in the list of channels created. In one embodiment, the group name assigned to each virtual named channel may be the name of the group of associated computers or framework.

At block 508, the network connection manager starts listening on each virtual named channel. The network connection manager may thus act as a server and listen for connection requests over a virtual named channel.

At block 510, broadcast messages are sent to announce the host and the corresponding virtual named channels. In one embodiment, multicast/broadcast message are sent out by a host management module as described above. The broadcast messages communicate to other computers on the network where a specific computer is and how to communicate with the computer. For example, on a IP based network a multicast packet may be sent out so computers can join a special multicast group as described above. An exemplary broadcast message data structure is described below.

At block 512, connections to a virtual named channel are accepted. As described above the network connection manager may use a group assigned to the virtual channel to verify group membership prior to accepting connections thereby ensuring that the computer trying to connect is part of the associated network of computers or framework.

At block 514, the virtual named channels are destroyed. After network connection manager has closed the channels as requested by application(s) 120 or user(s) 222, the network connection manager may destroy or disconnect the virtual named channels. The destruction of a virtual named channel means that connections can no longer be made to the virtual named channel. If all the channels are destroyed, the computer may not be able to communicate with other computers in the associated network of computers or framework for sharing resources. In one embodiment, the closing of channel and destroying of channels may be invoked by API calls to the network connection manager. The destruction of a channel may release resources associated with the virtual named channel as described herein.

Figure 6:
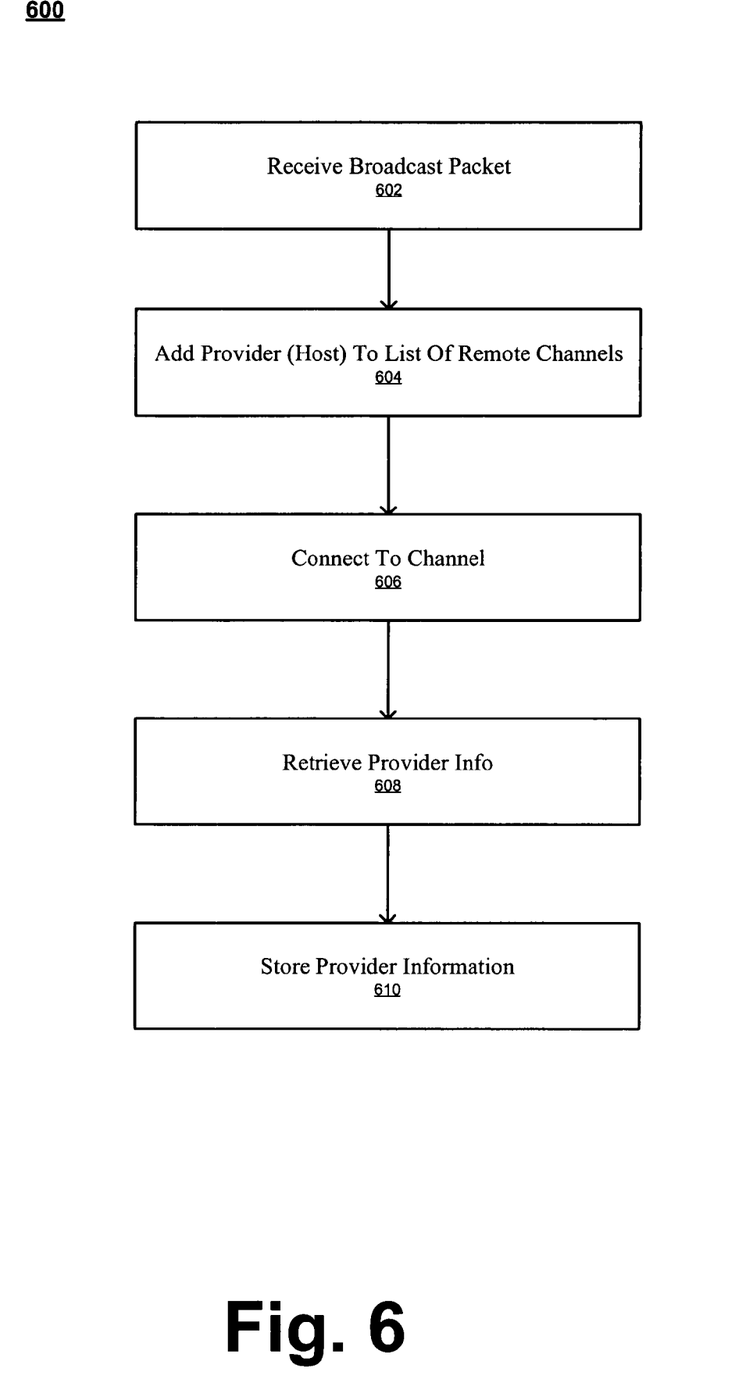
FIG. 6 is a flowchart of an exemplary process for discovering virtual named channels, in accordance with an embodiment.

FIG. 6 is a flowchart 600 of an exemplary process for discovering virtual named channels, in accordance with an embodiment. The discovery of virtual named channels allows connections to be made to the discovered channels and thereby allowing accessing of data, services, and/or devices over the channel.

At block 602, a broadcast message is received. The broadcast message may include a plurality of information including, but not limited to, the virtual channel name, host information, group information, and connection information. In one embodiment, the broadcast message may have been generated by a computer that has established a virtual named channel as described above and may be acting as a server or provider of data, services, and resources such as devices. When a host receives a broadcast message (e.g., multicast/ broadcast), the host may discard the message if the group name and password do not match the group information of the host. Based on the broadcast message, information may be retrieved such as a device list from the computer which sent the broadcast message. The broadcast message may be formatted as described below.

At block 604, the host which sent the broadcast message is added to the list of remote channels. The relevant content of the broadcast message may also be added to the list of remote channels. In one embodiment, each entry in a list of remote channels may include a list head entry, the connection interface handle, the address defined by the interface, the name of the virtual named channel provider, the machine type, a channel description, a property of the provider channel, and a list of the sub-channels.

At block 606, a virtual named channel is connected to by the network connection manager. In one embodiment, when a network connection manager instance is initialized a privileged virtual named channel with no name may be created which may be used for other hosts to connect to and for sending heartbeat messages. The underlying port of the privileged virtual named channel may be specified a broadcast message and stored in a broadcast message data structure as described herein. The connection to the virtual named channel may be made based on information in the list of remote channels which derives from the broadcast message received. The connection may be used to access various data, services, and/or devices.

At block 608, information about the virtual named channel provider or host is retrieved. In one embodiment, information about the devices and other host resources available through the virtual named channel is retrieved by an API call.

At block 610, information retrieved about the virtual named channel provider is stored. In one embodiment, device and other information retrieved is stored for use by a network connection manager.

Figure 7:
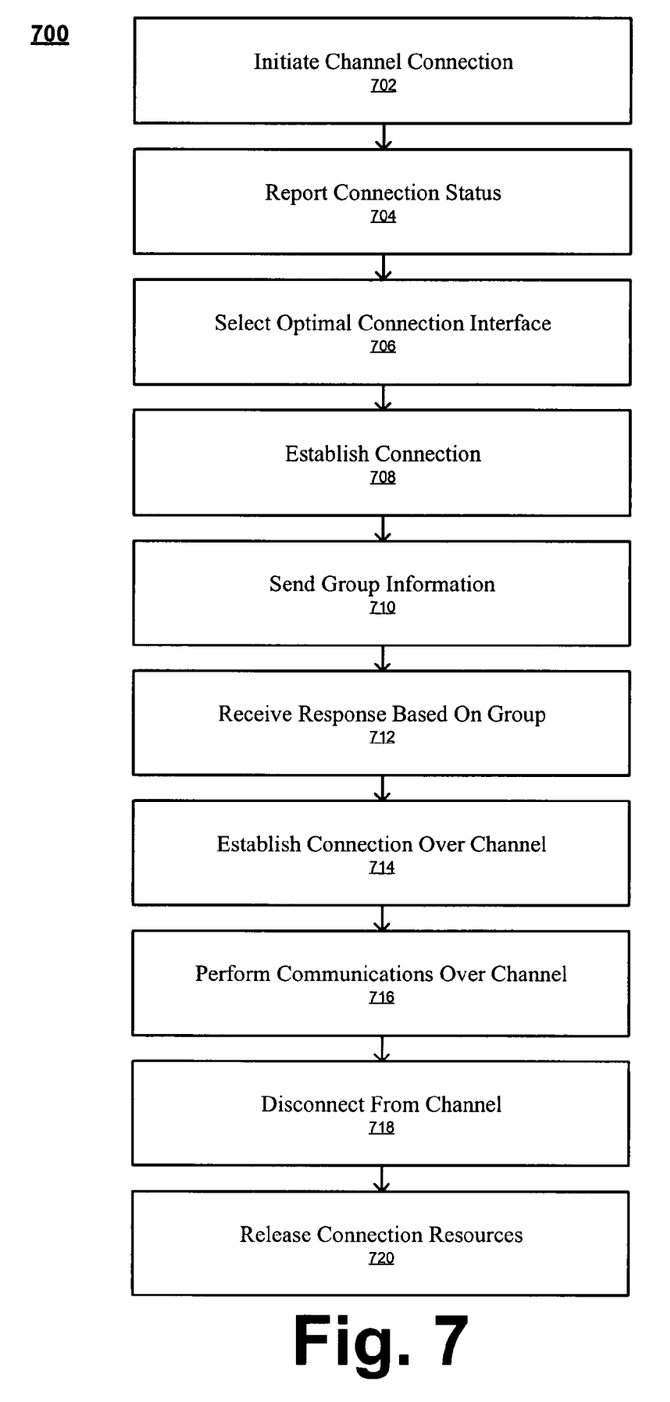
FIG. 7 is a flowchart of an exemplary process for connecting and transferring data over a virtual named channel, in accordance with an embodiment.

FIG. 7 is a flowchart 700 of an exemplary process for connecting and transferring data over a virtual named channel, in accordance with an embodiment. The blocks of flowchart 700 may be carried out by a computer acting as a client. It is appreciated the computer performing the blocks of flowchart 700 may be any sort of computing device as described above including a specialized server. Thus the computer is acting as a client to the extent that the computer is accessing resources or services on another computer. In one embodiment, the blocks of flowchart 700 may be initiated by application(s) 120 and/or user(s) 222 via API function calls.

At block 702, a connection to a virtual named channel is initiated. In one embodiment, the connection to a virtual named channel may be initiated by an API call with a parameter of the handle of a provider or host from the list of remote providers based on a broadcast message received as described herein. In another embodiment, the handle of the provider may be obtained from a device provider stored from information retrieved over a virtual named channel as described herein.

At block 704, the connection status is reported. In one embodiment, while the connection to the virtual named channel is being attempted, a message box may be displayed informing users of the status, e.g. "Connecting . . . Please wait . . . ."

At block 706, a selection of the optimal connection interface is performed. The selection may be performed when there is more than one connection interface available for a virtual named channel and the optimal network connection interface is chosen to establish a physical network connection. In one embodiment, the selection may be based on factors such as available bandwidth or the first connection discovered between two computers. It is appreciated that only one connection interface is needed for a network connection manager to facilitate network communications.

At block 708, a connection between the computers is established. The connection may be established via the optimal network connection determined as described above. In one embodiment, after the connection is established a handle instance of the connection is stored. The data structure storing the handle may include a connection interface handle, a handle for the connection, and a handle to the provider or host.

At block 710, group information is sent. The group information may be the group information (e.g., group name and password) stored and used as described above. In one embodiment, the network connection manager which has established the connection provides a length value and a group name to communicate the group name.

At block 712, a response based on the group provided is received from the computer accepting or denying the connection on the virtual named channel. In one embodiment, the computer accepting the connection on the virtual named channel identifies if both computers are in the same group or framework and returns an accept code of 1 if the computers are in the same group or a refuse code of 0 if the computers are not in the same group.

At block 714, a connection over the virtual named channels between the network connection managers of each machine is established. In one embodiment, between the network connection managers is established only after the group name identification or verification is successful.

At block 716, communications are performed over the virtual named channel. In one embodiment, read channel and write channel API calls may be made by application(s) 120 or user(s) 222 to send and receive data over the virtual named channel. For example, the read function may call the specified interface's read function to read data from the virtual named channel. The read and write functions may use a handle for the virtual named channel connection as a parameter to the API function call.

At block 718, the virtual named channel is disconnected. This may be invoked by API calls by application(s) 120 or user(s) 222 when the data transfer is complete and the virtual named channel connection is no longer needed.

At block 720, the virtual named channel connection resources are released. In one embodiment, the channel instance which was allocated when the connection was established is released.

EXAMPLE DATA STRUCTURE

Figure 8:
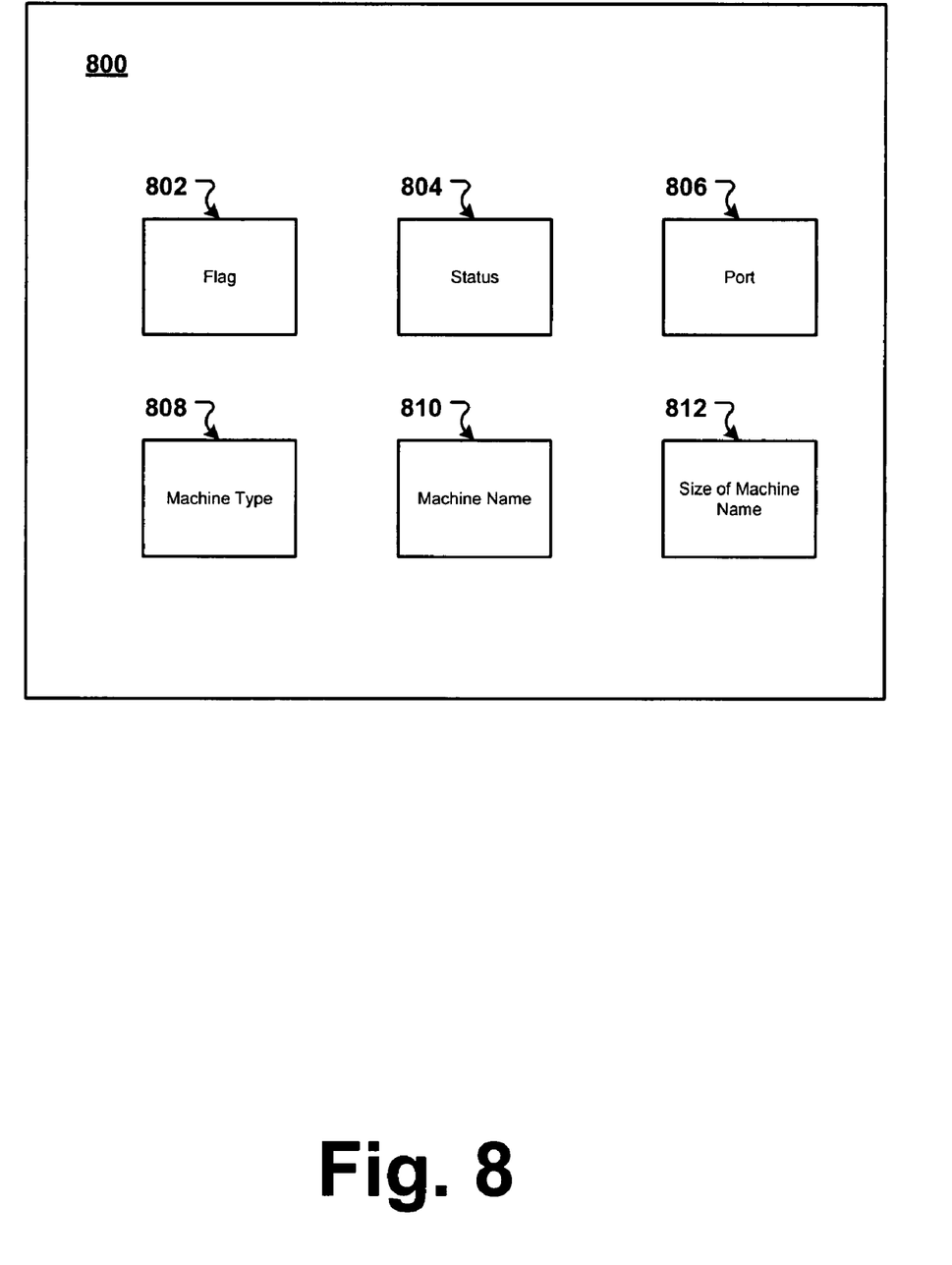
FIG. 8 illustrates a block diagram of a data structure, which is stored on a computer-readable medium, in accordance with an embodiment.

FIG. 8 shows a block diagram of a data structure 800, which is stored on a computer-readable medium, in accordance with an embodiment. It is appreciated that not all data fields of data structure 800 are necessary for the general goal of data structure 800 to be achieved. Moreover, it is appreciated that additional data fields may also be included in data structure 800 in accordance with various embodiments.

Data structure 800 may also be stored in a broadcast message format on computer-readable medium. In one embodiment, data structure 800 is UDP packet suited for broadcasting information corresponding to computers in an associated computer network or framework for sharing resources. The storing of data structure 800 in a packet allows a computer to broadcast the status of the computer to other computers in the associated network of computers or framework.

Data structure 800 includes a first data field 802 representing a flag. The flag may indicated whether the message is a passive broadcast or an active broadcast. In one embodiment, the flag may have two options QUERY_PROVIDER_INFO_FLAG and PROVIDER_INFO_FLAG. For example, because a broadcast message may lost when a QUERY_PROVIDER_INFO_FLAG is received, a passive broadcast message with PROVIDER_INFO_FLAG is sent in response. The two different flags prevents the two machines from infinitely broadcasting the messages.

Data structure 800 may further include a second data field 804 representing the status of a computer or host. In one embodiment, the second data field 804 or status field may have three settings start, running, and close. For example, the status field may indicate whether the broadcast message was sent out when the network connection manager was starting, running, or closing.

Data structure 800 may also include a third data field 806 representing the port number. For example, third data field 806 may contain the TCP port that can be used to connect to the virtual named channel.

Data structure 800 may further include a fourth data field 808 representing a machine type. Data structure 800 may further include fifth data field 810 representing the machine name. For example, the fifth data filed 810 may include the machine name which may be used to connect to the machine or host. Data structure 800 may further include sixth data field 812 representing the size of the machine name. For example, sixth data field 812 may be used to ensure that the machine name is stored in a data structure with the correct size.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for performing network communication, the method comprising:
    creating a plurality of virtual named channels on each of a plurality of network interfaces, wherein said plurality of virtual named channels allow network communication over the plurality of network interfaces using only a name of the virtual named channels and without requiring network specific information;
    listening on at least one of the plurality of virtual named channels;
    sending a broadcast message announcing said plurality of virtual named channels; and
    accepting connections on at least one of said plurality of virtual named channels.

2. The method as recited in claim 1 further comprising:
    selecting an optimal connection for communication via one of said plurality of virtual named channels when there is more than one network interface available for the virtual named channel.

3. The method as recited in claim 1 further comprising:
    registering a plurality of connection modules corresponding to the plurality of network interfaces, thereby allowing a network connection manager access to functions in each of the connection modules.

4. The method as recited in claim 1
    wherein each virtual named channel can be operated in a blocking mode or a non-blocking mode.

5. The method as recited in claim 1
    wherein each virtual named channel can be operated using a messaged based or byte-stream based format.

6. The method as recited in claim 1 further comprising:
    assigning each of said virtual named channels to one or more groups such that each virtual named channel created by a single network connection manager instance is assigned to the same group.

7. The method as recited in claim 1 further comprising:
    verifying a group assignment prior to accepting a connection to a virtual named channel.

8. A method for performing network communication, comprising:
    creating a virtual named channel, the virtual named channel configured to allow one or more applications to communicate over a plurality of network interfaces using only a name of the virtual named channel and without requiring network specific information;
    sending a broadcast message announcing said virtual named channel;
    establishing a connection between two computing devices by way of the virtual named channel; and
    performing communications between the two computing devices over said virtual named channel.

9. The method of claim 8 further comprising:
    reporting a status of the connection while a connection to the virtual named channel is being attempted.

10. The method of claim 8 further comprising:
    sending group information over said connection, the group information comprising a group name and password used to allow connection to the virtual named channel by a group of computers.

11. The method of claim 8 further comprising:
    disconnecting from said virtual named channel by making an application programming interface call when the virtual named channel is no longer needed.

12. The method of claim 8 further comprising:
    releasing resources related to said virtual named channel by releasing a channel instance allocated when the connection between two computing devices by way of the virtual named channel was established.

13. The method of claim 10 further comprising:
    receiving a response based on said group information, the response comprising an accept code if a computer attempting to establish a connection to the virtual named channel provides correct group information.

14. A computer storage media that is not a signal having computer-executable instructions stored thereupon which, when executed by a computer, cause the computer to:
    create a plurality of virtual named channels on each of a plurality of connection interfaces, wherein said plurality of virtual named channels allow network communication over a plurality of network interfaces using only a name of the virtual named channels and without requiring network specific information;
    listen on at least one of the plurality of virtual named channels;
    send a broadcast message announcing said plurality of virtual named channels;
    select an optimal connection for communication via said plurality of virtual named channels;
    maintain a plurality of information related to the plurality of network interfaces; and
    accept connections on at least one of said plurality of virtual named channels.

15. The computer storage media of claim 14, having further computer-executable instructions stored thereupon which, when executed by the computer, cause the computer to register a plurality of connection modules corresponding to the plurality of network interfaces, thereby allowing a network connection manager access to functions in each of the connection modules.

16. The computer storage media of claim 15, wherein each virtual named channel can be operated in a block mode or in a non-blocking mode.

17. The computer storage media of claim 16, having further computer-executable instructions stored thereupon which, when executed by the computer, cause the computer to assign each of said virtual named channels to one or more groups such that each virtual named channel created by a single network connection manager instance has the same group information.

18. The computer storage media of claim 17, having further computer-executable instructions stored thereupon which, when executed by the computer, cause the computer to verify a group assignment prior to accepting a connection to a virtual named channel.

* * * * *